No. 687,594. Patented Nov. 26, 1901.
S. BENNISON.
INDICATOR.
(Application filed July 13, 1901.)
(No Model.) 2 Sheets—Sheet 1.
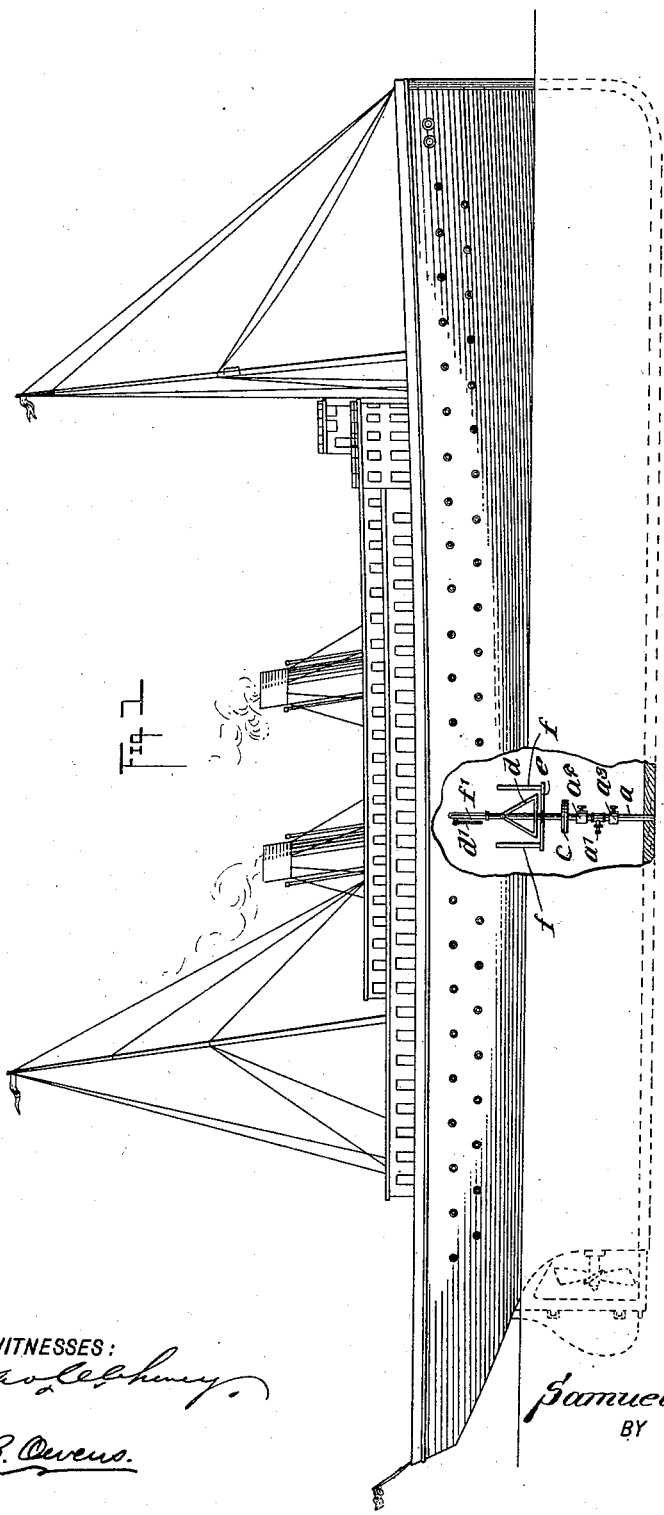
WITNESSES:
INVENTOR
Samuel Bennison
BY
ATTORNEYS No. 687,594. Patented Nov. 26, 1901.
S. BENNISON.
INDICATOR.
(Application filed July 13, 1901.)
(No Model.) 2 Sheets—Sheet 2.
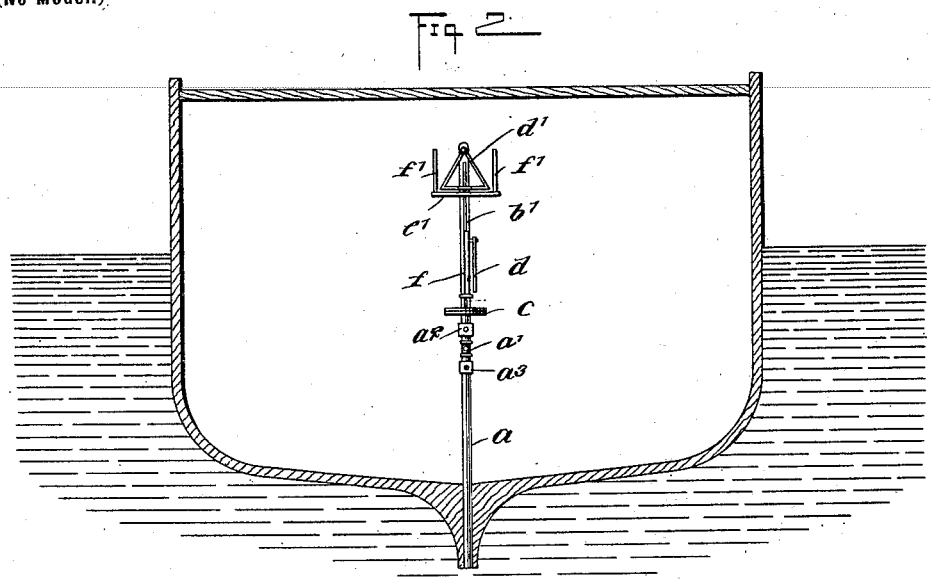
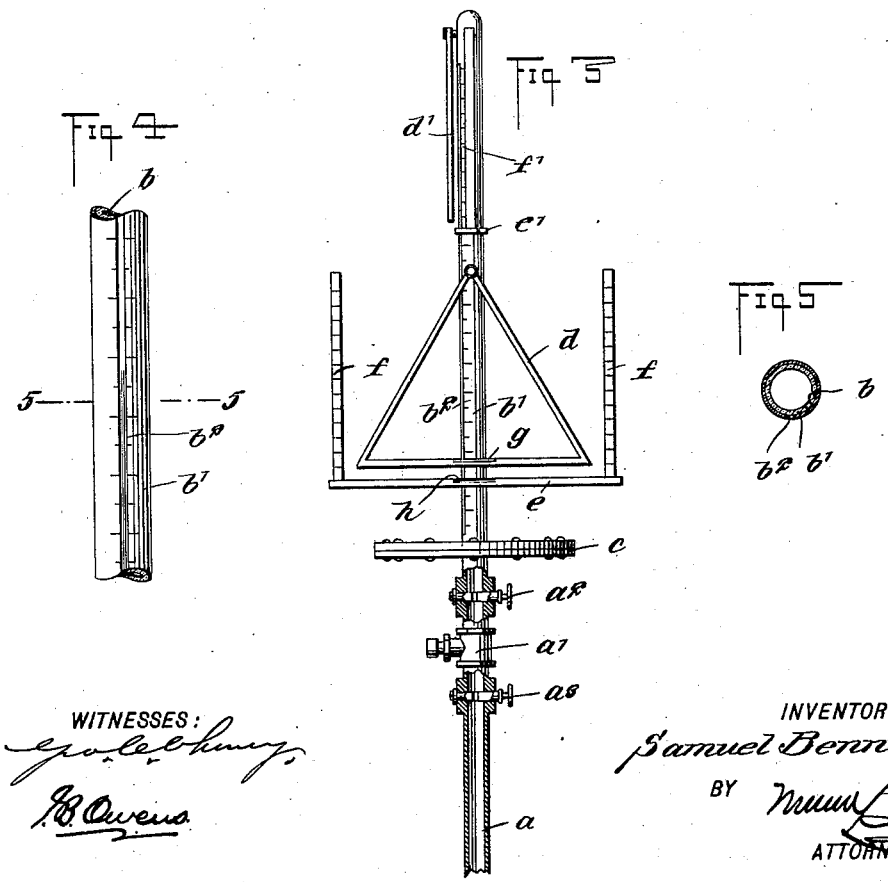
WITNESSES:
INVENTOR
Samuel Bennison
BY
ATTORNEYS

UNITED STATES PATENT OFFICE.

SAMUEL BENNISON, OF GALVESTON, TEXAS.

INDICATOR.

SPECIFICATION forming part of Letters Patent No. 687,594, dated November 26, 1901.

Application filed July 13, 1901. Serial No. 68,168. (No model.)

*To all whom it may concern:*

Be it known that I, SAMUEL BENNISON, a citizen of the United States, and a resident of Galveston, in the county of Galveston and State of Texas, have invented a new and Improved Indicator, of which the following is a full, clear, and exact description.

This invention relates to an indicator for vessels by which to show accurately and readily the draft of a vessel, as well as any list and pitch that may exist.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view of a steam vessel, showing parts broken away to illustrate the application of my invention. Fig. 2 is a cross-section of the same. Fig. 3 is an enlarged elevation, with parts in section, showing the invention. Fig. 4 is a still further enlarged detail of the device for indicating the draft, and Fig. 5 is a section on the line 5 5 of Fig. 4.

The vessel has its keel formed with a vertically-disposed passage running entirely through it, in which is fitted a tube $a$, having a T-fixture $a'$, at each side of which is a valve, (designated $a^2$ and $a^3$, respectively.) The T-fixture is adapted to be connected with a steam or water pipe from any suitable source, and by manipulating the valves $a^2$ and $a^3$ the upper or the lower end of the pipe may be blown out or cleaned, as desired. For example, should the lower portion of the pipe $a$ become clogged by mud or debris by closing the valve $a^2$ and opening the valve $a^3$ a stream of fluid under pressure entering the T-fixture $a'$ will pass down the lower part of the pipe $a$ and effectually clean it. $b$ indicates a glass gage-tube, which is provided with an opaque covering-tube $b'$, fitting tightly over it and having a longitudinally-disposed slot $b^2$ cut therein to expose the tube $b$ at points throughout its length. These tubes $b$ and $b'$ are joined by a union $c$ with the pipe $a$. The pipe $a$ extends upwardly in the vessel above the maximum water-line thereof, and when the valves $a^2$ and $a^3$ are opened the water will rise in the pipes $a$ and $b$ to a level exactly equal to the level of the water in which the vessel floats. By properly arranging a scale on the tube $b'$ the exact draft of the vessel will be indicated by the water in the tube $b$. Therefore any one desiring to know the precise draft which is carried by the vessel may secure the information by simply glancing at the tube $b'$ and the level of the water within the tube $a$.

In order to determine whether the vessel is listed and the degree of the list, I provide a triangular swing $d$, pivoted to the tube $b'$ at its upper end and hanging pendent alongside of the same, such swing extending athwartships and having at its lower end a straight edge or portion, which when the vessel is properly trimmed will lie truly horizontal. It is not absolutely essential that the swing have edges of the triangular construction shown, although this is preferred, and according to the construction shown the lower side of the triangle constitutes the straight edge referred to. A level-bar $e$ is fastened to the tube $b$ just below the swing $d$ and at right angles to the tube, this level-bar also extending athwartships and having at each end a vertically-disposed scale-bar $f$.

$g$ and $h$ indicate spirit-levels carried, respectively, by the lower part of the swing $d$ and by the level-bar $e$.

When the vessel is trimmed without a list, the straight edge on the swing $d$ and the level-bar $e$ will lie in true parallelism and the spirit-levels $g$ and $h$ will read equally. Should the vessel be listed to one side or the other, the swing $d$ will be inclined to the level-bar $e$ and the degree of the inclination may be determined by reference to the scales $f$. The same devices—that is to say, a swing $d'$, a level-bar $e'$, and scales $f'$—are applied to the upper part of the tube $b'$ and disposed fore and aft of the ship, so as to indicate the pitch of the vessel, and should the vessel be pitched by the stern or bow the degree of pitch may be readily determined by the indicating device, as before described.

Various changes in the form, proportions, and minor details of my invention may be resorted to without departing from the spirit and scope of my invention. Hence I consider myself entitled to all such variations as may lie within the scope of my claims.

Having thus described my invention, I claim as new and desire to secure by Letters Patent—

1. The combination of a vertically-extending support, a swing hung thereon and having a straight lower portion normally lying horizontal, a level-bar rigidly attached to the support at right angles thereto, and spirit-levels carried respectively on the swing and level-bar.

2. The combination of a vertically-extending support, a swing hung thereon and having a straight lower portion lying horizontal, a level-bar rigidly attached to the support at right angles thereto, and a scale carried by the level-bar and rising therefrom, said scale reading with reference to the swing to determine the inclination of the said support.

In testimony whereof I have signed my name to this specification in the presence of two subscribing witnesses.

SAMUEL BENNISON.

Witnesses:
F. LAUTERBACH,
GEORGE W. CAMPBELL.